Oct. 16, 1945.  D. E. BADERTSCHER ET AL  2,386,773
SEPARATION OF TERTIARY BASE OLEFINS FROM HYDROCARBON MIXTURES
Filed April 4, 1944

INVENTORS
Darwin E. Badertscher
Duncan J. Crowley
Charles F. Feasley
BY
ATTORNEY Patented Oct. 16, 1945

2,386,773

UNITED STATES PATENT OFFICE 2,386,773

SEPARATION OF TERTIARY BASE OLEFINS FROM HYDROCARBON MIXTURES

Darwin E. Badertscher, Woodbury, Duncan J. Crowley, Penns Grove, and Charles F. Feasley, Thorofare, N. J., assignors to Socony-Vacuum Oil Company, Incorporated, a corporation of New York Application April 4, 1944, Serial No. 529,484

17 Claims. (Cl. 260—677)

This invention has to do with a selective method for effecting the separation of certain olefins from hydrocarbon mixtures. More specifically, the present invention has to do with a vapor phase, catalytic treatment of a hydrocarbon mixture with H₂S whereby only those hydrocarbons of a sub-class of olefins, hereinafter defined as the "tertiary base" olefins, are converted to their corresponding mercaptans and has to do with a subsequent vapor phase treatment—thermal or catalytic—of said mercaptans whereby substantially pure "tertiary base" olefins are isolated.

"Tertiary base" olefins are defined herein as those olefins which are characterized by the presence of the tertiary olefin linkage wherein R is a low molecular weight alkyl group such as methyl, ethyl, etc. Typical members of this class, and preferred herein, are isobutylene $(H_3C)_2C=CH_2$, and trimethyl ethylene, For some time, considerable attention has been directed to the problem of separating the various types of hydrocarbons from hydrocarbon mixtures. One such problem has been that of separating one or more of the tertiary base olefins from hydrocarbon mixtures. For example, the problem of separating isobutylene, a tertiary base olefin, from a mixture of C₄ hydrocarbons has been approached from several directions; yet with one possible exception (discussed hereinafter), none of the approaches previously made has been at all satisfactory. The obvious method, namely, fractional distillation, is extremely laborious and time consuming in view of the relatively narrow boiling range of the several C₄ hydrocarbons, as shown below:

| C₄ hydrocarbons | Boiling point, °C./atm. pres. |
|---|---|
| Isobutane | −12.4 |
| Isobutylene | −6.7 |
| Butene—1 | −5.0 |
| Butadiene | −2.6 |
| n-Butane | −0.6 |
| Butene—2 (trans) | +1.3 |
| Butene −2 (cis) | +3.7 |

Another physical method resorted to for separating olefins from saturates involves the use of various azeotropic distillation procedures. While such methods have been successfully used to separate olefins from saturates, they have not been so specific as to separate tertiary base olefins from other olefins, normal or secondary. The same can be said for solvent extraction methods. In short, physical methods have not proven to be sufficiently selective for tertiary base olefins.

Chemical procedures have also been proposed for the separation of olefins from saturates and some of these have been somewhat specific for the separation of tertiary base olefins from other olefins. One such procedure (referred to hereinabove) which has been applied commercially, is based upon the tendency of isobutylene to be selectively absorbed by 60–70% sulfuric acid at room temperature. In said procedure, isobutylene is thereafter expelled from the acid when the acid is heated. This procedure is characterized, however, by some undesirable features; for example, an appreciable portion of the isobutylene is lost through polymerization, and normal butenes—in the presence of isobutylene— also tend to be absorbed by the same acid, in which case the regenerated isobutylene is contaminated with normal butenes. Another chemical method which has been proposed involves the selective alkylation of phenols by tertiary olefins in the presence of certain catalysts. In the latter process, phenols are alkylated by isobutylene and substantially all of the remaining C₄ hydrocarbons do not so alkylate the phenols. The tertiary phenols are subsequently heated in the presence of a catalyst whereupon isobutylene is regenerated.

As will be apparent from the following, the present invention involves the second general type of approach to the problem of separating tertiary base olefins from hydrocarbon mixtures, namely, a chemical method.

We have discovered that a tertiary base olefin contained in a hydrocarbon mixture can be separated therefrom in a substantially pure condition by means of the following new and novel method. A hydrocarbon mixture containing a tertiary base olefin is first treated with H₂S in the vapor phase and in the presence of a catalyst at a well-defined temperature as hereinafter described, whereupon only the tertiary base olefin in said mixture is converted to its corresponding tertiary mercaptan, the other hydrocarbons in said mixture not being so converted; the said tertiary mercaptan contained in the reaction mixture obtained by the initial operation is then separated therefrom; and the said tertiary mercaptan is heated alone or in the presence of a catalyst of the type used in the initial treatment, at a temperature in excess of the optimum temperature for the first-mentioned operation, as hereinafter described, whereupon the said mercaptan decomposes to the corresponding tertiary base olefin and hydrogen sulfide, and said olefin is isolated in a substantially pure state—and H₂S is recovered for reuse.

It will be understood that a hydrocarbon mixture containing more than one tertiary base olefin can be similarly treated. In such case, the corresponding tertiary mercaptans formed in the above-described initial operation can be separated from the reaction mixture and heated individually or collectively, with or without said catalyst, at a temperature in excess of the optimum temperature for the initial operation. When the tertiary mercaptans are heated together in the last-mentioned operation, it will be clear that the corresponding teritary base olefins will be formed and that said olefins can be readily separated from each other by any one of a number of available separation procedures, such as fractional distillation, fractional crystallization, etc. Similarly, the tertiary mercaptans obtained from the initial operation can be separated from each other and heated individually as indicated above.

It is well known to those familiar with the art that olefins will react with H₂S in the presence of various catalysts to form mercaptans. For example, it has been suggested that olefins of at least eight carbon atoms will react with H₂S in the liquid phase in the presence of certain catalysts, at time intervals of from 6 to 72 hours, to form sulfur-containing compounds including sulfides and mercaptans. In the present invention, the initial treatment of a hydrocarbon mixture containing one or more tertiary base olefins with H₂S in the presence of a catalyst distinguishes over the foregoing procedure, in that said treatment is carried out in the vapor phase with a comparatively short contact time which may vary from a fraction of a second to several minutes. Another fundamental distinction between previously proposed processes for the conversion of olefins to mercaptans, and the initial operation of the present invention is predicated upon our discovery that this catalytic treatment is selective for the conversion of certain olefins to their corresponding mercaptans. That is, in this initial treatment, only the tertiary base olefins, typified by the C₄ and C₅ "tertiary base" olefins, isobutylene, trimethyl ethylene, and 2-methyl butene-1, contained in a mixture of hydrocarbons are converted to their corresponding tertiary mercaptans when the hydrocarbon mixture in the vapor phase and in admixture with H₂S is passed over a suitable catalyst with the temperature of the catalyst or reaction zone maintained within certain preferred limits, depending upon the nature of the catalyst, the pressure in the reaction zone, etc. This initial operation, namely, the selective catalytic conversion of tertiary base olefins to their corresponding mercaptans, is more fully discussed in co-pending applications Serial No. 461,116, filed October 7, 1942; Serial No. 474,924, filed February 6, 1943; and Serial Nos. 492,669 and 492,670, filed June 29, 1943; in all of which two of the present inventors, Darwin E. Badertscher and Duncan J. Crowley, are co-inventors.

The catalysts which have been found to be effective for the purpose of selectively converting tertiary base olefins to their corresponding mercaptans are the following: acids and thioacids of phosphorus and their anhydrides and thioanhydrides, elementary (red) phosphorus, sulfuric acid and organic sulfonic acids, non-plastic clay-type catalysts typified by fuller's earth, alumina-silica type synthetic catalysts, tungstic acid and halogenated acids, such as trichloracetic, etc. Thus the catalysts useful for the present invention are those which will promote the conversion of a tertiary base olefin with hydrogen sulfide to the corresponding tertiary mercaptan under the conditions defined herein. For the purposes of the present invention, preference is given herein to the acids and thioacids of phosphorus and their anhydrides and thioanhydrides, representative of which are $H_3PO_4$, $H_3PO_3$, $P_2O_5$, $P_2O_3$, $H_3PS_4$, $P_2S_5$, etc.; particular preference being given to phosphoric acid. There is little, if any, diminution in the effectiveness of our preferred catalysts as used herein. Naturally, the presence of appreciable amounts of moisture in the reactants would tend to leach out water-soluble catalysts such as phosphoric acid. Therefore, it is desirable to dry the gases prior to contacting them with the catalyst. The drying of the gases prior to introduction into the reactor presents no difficulties and is routine procedure to those familiar with the chemical and petroleum arts. Depending upon the physical properties of the phosphorus compound, the catalyst may be used alone (particularly if comprised of solid particles) or adsorbed on the surface of a suitable inert carrier, the latter form being preferred.

As indicated above, the method contemplated herein involves a subsequent treatment of the tertiary mercaptan (or tertiary mercaptans) obtained in the initial operation, such that said mercaptan (or mercaptans) is decomposed or converted back to the corresponding tertiary base olefin (or olefins) and H₂S. It will be clear from the foregoing that this subsequent treatment or operation follows a separation operation in which the tertiary mercaptan (or mercaptans) is separated from those hydrocarbons which are contained in the hydrocarbon mixture (subjected to the initial operation) and which are not converted to their corresponding mercaptans by said treatment; such hydrocarbons include normal olefins, secondary olefins, diolefins such as butadiene, cyclic olefins, acetylenes, saturated hydrocarbons, aromatics, heterocyclics, etc.

One of the most important factors in the method contemplated herein is temperature control. As discussed in the aforementioned co-pending applications, the reaction of hydrogen sulfide with a tertiary base olefin to form a tertiary mercaptan in the presence of one or more of the aforesaid catalysts, is quite sensitive to temperature. For example, it was effectively shown in application Serial No. 461,116, that the operative temperature range with a catalyst selected from the group consisting of acids and thioacids of phosphorus and their anhydrides and thioanhydrides, is from about 25° C. to 175° C., and that the optimum temperature with such a catalyst is in the neighborhood of 75° to 80° C. Similarly, it was shown in application Serial No. 474,924, that the operative temperature range with non-plastic clay-type catalysts, such as fuller's earth, is from about 55° C. to about 200° C., and the optimum temperature, as above, is of the order of 75–80° C. In the same manner, it was shown in application Serial No. 492,669 that the operative temperature range with elementary phosphorus as the catalyst is from about 25° C. to about 200° C., and the optimum temperature is at about 55° C. Correspondingly, when organic sulfonic acids and sulfuric acid are used as catalysts in the initial operation, the operative temperature range is from about 25° C. to about 100° C., with the optimum temperature of the order of 75° C.; this is discussed at length in application Serial No. 492,670. In view of the several operative temperature ranges described above, the temperature of the initial operation is defined herein as a "selective conversion temperature."

Temperature control is also a most important consideration in the decomposition of the tertiary base mercaptan formed in the initial operation. As set forth above, the temperature at which a tertiary base mercaptan is caused to revert to the corresponding tertiary base olefin is greater than the optimum temperature for the synthesis of the said mercaptan. Thus when the same catalyst is used for the reversion of the mercaptan to the corresponding tertiary base olefin, the following relationships will be noted: when the catalyst is one selected from the group consisting of acids and thioacids of phosphorus and their anhydrides and thioanhydrides, the temperature necessary for the reversion of the tertiary mercaptan to the corresponding tertiary base olefin will be greater than 75-80° C., which is the optimum temperature shown in application Serial No. 461,116, and will preferably be greater than about 150° C. As will appear from the data presented hereinafter, a temperature of about 230° C. is particularly effective for this operation when phosphoric acid is used as the catalyst. With regard to the other catalysts referred to above in connection with the aforesaid co-pending applications: temperatures greater than about 80° C. should be used with fuller's earth; greater than about 55° C. with elementary phosphorus; and greater than about 75° C. with organic sulfonic acids and sulfuric acid. It will be apparent that the temperature used for this operation should not exceed that temperature at which the isobutylene—or other tertiary base olefin—so produced would tend to decompose to other products.

As pointed out hereinabove, the operation in which a tertiary mercaptan is decomposed to the corresponding tertiary base olefin may also be a thermal operation in which no catalyst is used. Although the temperatures for this thermal operation are substantially higher than for the above-described catalytic operation, the yield of tertiary base olefin is generally higher than when one of the aforesaid catalysts is used. This may, perhaps, be due to a relatively greater degree of polymerization when one of said catalysts is used. It may be said that the minimum temperature for the thermal operation should not only be greater than the optimum temperature at which the tertiary mercaptan is formed in the initial operation, but it should also be greater than the maximum temperature effective in said initial operation. In general, then, temperatures greater than about 150° C. should be used, and preferably temperatures of the order of 300° to 450° C. It will also be apparent that the temperatures used in the thermal decomposition of said tertiary mercaptan should not be so great as to cause the decomposition of the corresponding tertiary base olefin so formed.

Not only is a tertiary base olefin, contained in a hydrocarbon mixture, converted to the corresponding tertiary mercaptan when said mixture is treated with $H_2S$ in the presence of one or more of the foregoing catalysts, but a portion of said olefin is also converted to the corresponding sulfide and other sulfur-containing products and to the corresponding di- or poly-olefins. For example, when a hydrocarbon mixture containing isobutylene is so treated, a predominant proportion of said isobutylene is converted to tertiary butyl mercaptan, smaller proportions also being converted to such products as tertiary butyl sulfide $(H_3C)_3C-S-C(CH_3)_3$ and di-isobutylene. These materials, the sulfides and di- or poly-olefins corresponding to the tertiary base olefins present in the original hydrocarbon mixture, have also been found to respond to the subsequent thermal or catalytic treatment, thus yielding pure isobutylene. As will appear hereinafter in discussion of illustrative data, the temperatures at which such materials decompose or revert to the corresponding tertiary base olefin are somewhat higher—generally, about 100° C. higher—than those at which the related tertiary mercaptans decompose. It is to be understood, therefore, that such intermediate products are contemplated as desirable sources for the obtainment of substantially pure tertiary base olefins, in addition to the related tertiary mercaptans.

It will be apparent to those skilled in the art that the decompositions or reversions of the aforesaid tertiary mercaptan, sulfide and tertiary base olefin polymers to the corresponding tertiary base olefin, may be represented by the following relationships in which isobutylene and the aforesaid derivatives thereof are chosen for the purposes of illustration.

wherein X is a whole number.

Obviously, the mercaptan shown as formed in (2-b) above can undergo decomposition to isobutylene in the manner described by (1).

Further details in a preferred procedure for carrying out the process contemplated by this invention may be obtained from the following description taken with the accompanying drawing, which is chosen for illustrative purposes only and in which.

Figures 1, 2:
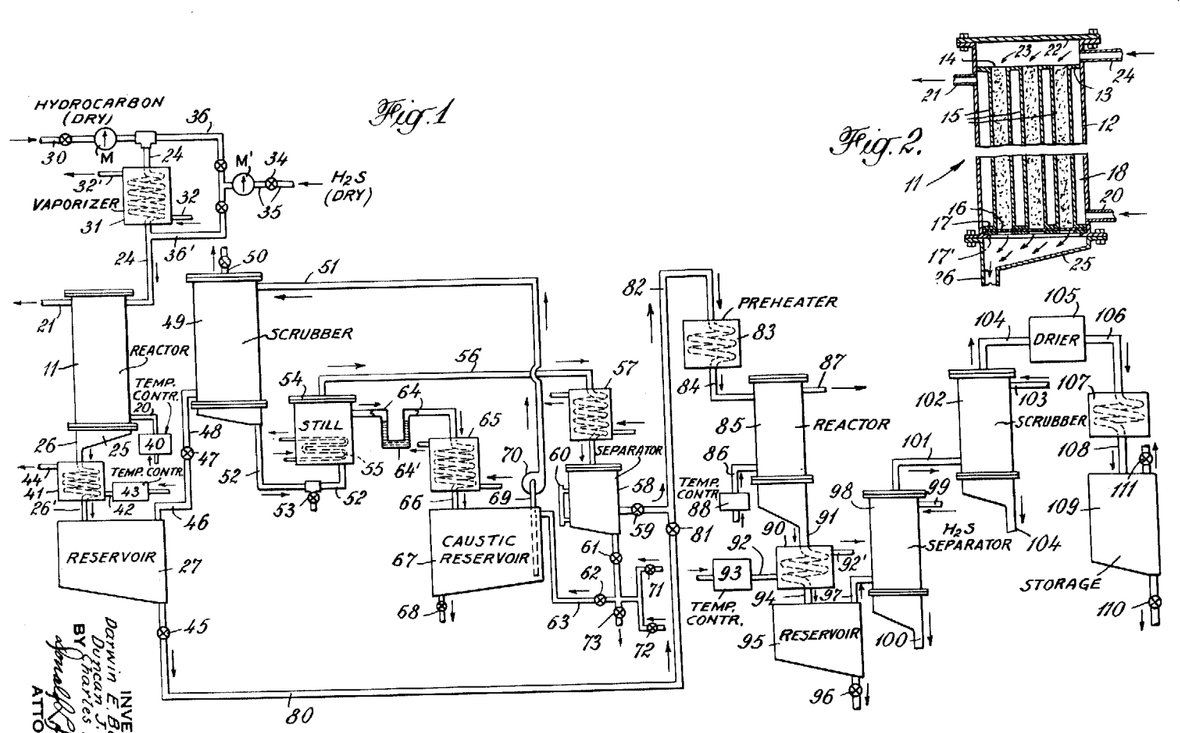
Figure 1 is a diagrammatic view illustrating one form of apparatus which may be employed in practicing the process of this invention.
Figure 2 is a sectional elevation showing in enlarged detail a typical form of reactor which may be employed in the system shown in Figure 1.

In Figure 1, reference numeral 11 indicates a reactor which is shown in Figure 2 as embodying a shell 12 which may be of circular or other suitable cross-sectional shape, such shell being provided near its top with a partition plate 13, having a plurality of openings 14, which receive the upper ends of tubes 15 secured therein in any suitable manner, such as welding (not shown). The lower ends of the tubes 15 are supported in openings 16 through a bottom partition plate 17 secured near the bottom of the shell 12 in any suitable manner so as to form a chamber 18 in the shell between plates 17 and 13. For the purpose of controlling the temperature within the tubes 15, a suitable heat exchange medium is circulated through the chamber 18 from an inlet 20 to an outlet 21.

The top of the chamber or shell 12 is provided with a cover 22, which with the top partition plate 13 forms a chamber 23 in the top of the shell adapted to receive reaction vapors through an inlet 24, which vapors enter the various tubes from the chamber 23, as indicated by the arrows. The bottom of the shell 12 is provided with a bottom cover 25, through which the products of reaction pass from the tubes 15 into the product outlet 26.

The bottoms of the various tubes 15 are provided with a suitable mesh material to support a body of catalyst indicated by the stippling in Figure 2 within these tubes. This mesh material may be supported in any suitable manner and, as shown in Figure 2, comprises a screen supported beneath the bottom plate 17 by a similarly perforated plate 17'.

As aforesaid, the reaction contemplated herein is quite sensitive to temperature control; and although the length and size of the reaction tubes 15 and the relation between the total volume of the chamber 18 and the volume within such chamber which is occupied by the reaction tubes may be varied over relatively wide limits, it is to be understood that the relationship between these various factors, the temperature of the heat exchange medium, and the rate at which heat exchange medium is circulated through the chamber 18 should be so adjusted as to maintain the temperature in the reaction zones of the various catalyst tubes 15 within the range for most efficient operation, as will be hereinafter discussed.

Referring back to Figure 1: reference numeral 30 indicates a conduit adapted to carry hydrocarbons through a meter M into the reactor inlet conduit 24. This conduit is shown as passing through a pre-heater or vaporizer 31, through which a hot heat exchange medium is circulated by means of connections 32 and 32'. Hydrogen sulfide is introduced into the system through the valve 34, conduit 35 and a meter M', such hydrogen sulfide being optionally introduced into the inlet 24 on either side of the vaporizer 31 by means of valved connection 36 or 36'.

With regard to the pre-heater or vaporizer 31, it is to be understood that other suitable means may be provided for insuring that the reactants are in the vapor phase when they pass into the catalyst tubes in the reactor. For example, it may be found, particularly after the reaction has been started, that there is sufficient heat in the reactor itself to effect this vaporization, or heater coils may be provided in the chamber 23, as will readily appear to those skilled in the art.

Suitable means for controlling the temperature of the heat exchange medium entering the reactor through inlet 20 are indicated by reference numeral 40. The temperature-control means 40 may be any suitable heat exchange device and can be either manually or automatically operated in any manner well known to those skilled in the art. Also, if desired, the heat exchange medium may be recirculated from the outlet 21 through the temperature control 40 to the inlet 20 as will also be obvious to those skilled in the art. Any suitable heat exchange medium, such as water, may be employed to control the temperature in the chamber 18 or reactor 11.

Reference numeral 41 indicates a cooler or condenser through which the product-outlet conduit 26 passes into conduit section 26', which opens into a sealed receiving chamber 27. The cooler or condenser 41 is provided with an inlet 42 equipped with temperature-controlling means 43 and with a heat exchange medium-outlet section 44. The temperature of the cooler 41 may be controlled through the controlling means 43 so as to condense substantially all of the mercaptan which can then be withdrawn together with the higher boiling products (included among which are the sulfide and the polymers of the tertiary base olefin) of reaction from the sealed chamber 27 through a valved liquid-outlet connection 45 to conduit 80 which is provided with an adjustable valve 81, and which connects with a second reaction chamber or reactor 85 wherein the mercaptan and higher boiling products are decomposed to the corresponding tertiary base olefin; or, such temperature in the cooler 41 may be controlled so that only the high boiling products are condensed, substantially all of the mercaptan together with the hydrogen sulfide and hydrocarbon gases being conducted in such case from the sealed chamber 27 through a vapor-outlet conduit 46, valve 47 and conduit 48 to the bottom of a scrubbing tower 49.

The top of the scrubbing tower 49 is provided with a gas vent 50 and an inlet conduit 51 for a scrubbing solution such as aqueous caustic soda. The bottom of the scrubber 49 has an outlet 52 which connects with the bottom of a still or stripper 54, the outlet 52 being equipped with a drainage valve 53. The still or stripper 54 is shown as being equipped with a high-pressure steam coil or other suitable source of heat 55 and has an outlet 56 which connects through a condenser 57 with a separator 58. The separator 58 is provided with a valved mercaptan outlet 59, a sight glass 60 to facilitate removal of mercaptan and a valved water outlet 61. The water outlet 61 connects through a valve 62 with a water return pipe 63, which in turn is shown as connecting with the caustic reservoir 67. The still 54 is shown as being equipped with a caustic outlet conduit 64 which includes a liquid caustic well 64', the purpose of which is to prevent mercaptan vapor from leaving still 54 by the conduit 64. Caustic solution passes through conduit 64 to a caustic cooler 65 and exits therefrom through outlet 66 to the caustic reservoir 67. The caustic reservoir is fitted with a drainage means 68. The caustic reservoir is also equipped with a conduit 69 which connects with the intake side of a pump 70. The discharge side of pump 70 is shown as connecting with inlet conduit 51 of scrubber 49. Means indicated at 71 are provided for adding fresh caustic, and means indicated at 72 are provided for adding fresh water to the system when desired. A water drain is shown at 73, and the last-described connections are shown as being provided with suitable valves for controlling the addition or discharge of the various media.

The second reactor 85 is shown as connecting with conduit 82 which carries mercaptan from the separator 58 or carries high boiling reaction products, with or without said mercaptan, from the sealed reservoir 27 to a second preheater or vaporizer 83 and conduit 84. The preheater or vaporizer 83 is similar to the preheater 31 described above, and the reactor 85 may be the same as reactor 11 (Figure 2) already described. As indicated above, however, the reactor 85 may be void of catalyst in which case it is preferably comprised of reactor tubes 15 (in Figure 2) containing inert solid particles as a contact medium.

Reactor 85 is equipped with suitable means for controlling the heat exchange medium entering the reactor through inlet 86 and exiting through outlet 87, such means being indicated by reference numeral 88. Temperature control means 88 is similar to the temperature control means 40 referred to hereinabove and contains a suitable heat exchange medium.

Reference numeral 90 indicates a cooler or condenser through which the product flows from reactor 85 and reactor outlet 91. Cooler 90 is provided with a heat exchange medium-inlet 92 equipped with a temperature control means 93 and with a heat exchange medium-outlet connection 92'. The product cooled in the cooler 90 passes through the conduit 94 into a cold reservoir 95 which is equipped with a valved liquid-outlet connection 96 through which condensed high boiling products and undecomposed mercaptan can be withdrawn. The reservoir 95 is also equipped with a vapor conduit outlet 97 through which tertiary base olefin and hydrogen sulfide flow into a hydrogen sulfide separator 98.

The separator 98 is provided with an inlet conduit 99 for a solution such, for example, as aqueous tri-potassium phosphate which removes hydrogen sulfide present in the vapor entering the separator. The bottom of the separator 98 has an outlet 100 through which the solution such as aqueous tri-potassium phosphate and hydrogen sulfide in the form of potassium acid sulfide is removed. The top of the separator 98 is provided with a vapor conduit 101 through which tertiary base olefin and any unchanged tertiary mercaptan pass. The vapor conduit 101 connects with a scrubber 102 which is provided with an inlet conduit 103 for a scrubbing solution such as aqueous caustic soda which removes traces of mercaptan present in the vapor entering said scrubber. The bottom of the scrubber 102 has an outlet 104 through which aqueous caustic soda, containing some tertiary mercaptide, is removed.

The top of the scrubber 102 is provided with a vapor conduit 104 through which tertiary base olefin passes. The vapor conduit 104 connects with the drier 105 containing a suitable drying medium such as calcium cloride, and the drier 105 is in turn connected with a condenser (or compressor) 107 through conduit 106. The condenser 107 is also attached, through conduit 108, to a storage reservoir 109 which is equipped with a valved liquid outlet 110 and with a valved vapor outlet 111, the latter outlets being means for withdrawing substantially pure tertiary base olefin from the system.

In practicing a preferred form of the present invention with apparatus of the type shown in Figures 1 and 2, a hydrocarbon mixture containing a tertiary base olefin, and hydrogen sulfide are metered into the system through meters M and M', respectively. The proportions of these two reactants may be varied over relatively wide limits, but for optimum results it is preferred that these proportions be such that the hydrogen sulfide be slightly in excess of the molar equivalent required to react with the tertiary olefin which is present.

The admixture of hydrocarbon and H₂S is introduced into the reactor 11 in the vapor phase, as by first passing the hydrocarbon through the vaporizer 31 prior to admixture with H₂S. Upon entering the reactor 11, the hydrocarbon-H₂S vapor mixture passes through the catalyst tubes 15 where it contacts the catalyst for a short period of time. It is an important feature of the method that the period of catalyst contact is comparatively short. With a catalyst of the type described hereinabove, contact times of from about a fraction of a second to several minutes serve the purposes of the present method, but in general, a contact time of a few seconds to 2 or 3 minutes is preferred. The temperature of the heat transfer medium in chamber 18 is controlled by the temperature control means 40 so that the temperature of the catalyst zone within the tubes 15 is maintained within the range that will give the desired conversion. As aforesaid, the selective conversion of a tertiary base olefin to the corresponding tertiary mercaptan is quite sensitive to temperature, and for this reason the temperature of the catalyst zone should be carefully controlled.

When in contact with the catalyst in the catalyst tubes 15 under the conditions described herein, the tertiary base olefin reacts with the hydrogen sulfide in the reaction mixture to form the corresponding tertiary mercaptan. By way of illustration, when the tertiary base olefin present in the original hydrocarbon mixture is isobutylene, tertiary butyl mercaptan is formed and also a small amount of higher boiling materials which are predominantly comprised of tertiary butyl monosulfide and di-isobutylene. Other hydrocarbons present in the original hydrocarbon mixture do not so react with the hydrogen sulfide and pass through the catalyst zone substantially unchanged. Thus, the effluent gases leaving the reactor 11 through discharge conduit 26 contain tertiary butyl mercaptan, high boiling materials including tertiary butyl monosulfide and di-isobutylene, unreacted hydrocarbons (other than isobutylene or other tertiary base olefins) and unreacted H₂S. As indicated above, the unreacted hydrocarbons present in the effluent gases may include normal olefins, secondary olefins, saturated hydrocarbons and others as indicated hereinabove.

The effluent gases flow through the discharge conduit 26 to the condenser 41. As aforesaid, the temperature of the condenser may be maintained such that only the high boiling products are condensed, in which case, the condensate flows into the sealed chamber 27, from which it can then be withdrawn through the valved outlet connection 45. The condensate may be so withdrawn and carried through the conduit 80 to the second reactor 85 as described hereinafter. The unreacted hydrocarbons, unreacted H₂S and tertiary butyl mercaptan are not condensed when such a temperature is maintained in the condenser 41, and flow through the vapor-outlet conduit 46.

The preferred procedure for separating the tertiary butyl mercaptan from unreacted hydrocarbons and unreacted H₂S, in conduit 46, involves a scrubbing treatment. The vapors in conduit 46 flow through the valve 47 and conduit 48 to the bottom of the scrubbing tower 49. The vapors rise in the scrubber 49 and contact a downstream of scrubbing solution, such as aqueous caustic soda whereupon tertiary butyl mercaptan and hydrogen sulfide are converted respectively to the corresponding soluble alkali mercaptide and alkali sulfide or hydrosulfide. The unreacted hydrocarbons are unaffected by the caustic soda and are removed through the gas vent 50 from which they may be conducted to another operation or treatment such as alkylation, polymerization, or the like. The alkali mercaptide and alkali sulfide or hydrosulfide in caustic solution pass out of the scrubber 49 through the outlet connection 52 to the still 54. High-pressure steam or other heating medium passes through the coil 55 in the still 54, thereby heating the caustic solution to an elevated temperature. On heating the caustic solution, the alkali mercaptide is converted to the corresponding tertiary butyl mercaptan which, along with some water, distills from the solution. The tertiary butyl mercaptan-water vapors rise to the outlet 56, flow therethrough to the condenser 57 where they are condensed and from which the condensate flows to the separator 58. The condensate separates herein (58) into an upper layer of tertiary butyl mercaptan, and a lower layer of water. The mercaptan layer is withdrawn through the valved outlet 59, a sight glass 60 being provided to facilitate the mercaptan withdrawal.

The lower water layer is allowed to drain from the bottom of the separator, through the valved water outlet 61. It is recombined, in passing through the valve 62 and the water-return pipe 63, with the caustic solution which has been discharged from the still 54. This caustic solution has passed through conduit 64, well 64', the cooler 65 and conduit 66 to caustic reservoir 67. This cold caustic solution, which contains some alkali sulfide, combined with water from the separator 58, is pumped by means of the pump 70 to the caustic scrubber 49 through the inlet 51. If, however, said caustic solution from the still 54 tends to accumulate an appreciable amount of alkali sulfide, it can be removed from the system by means of the drain 68, and can be replaced with a desired amount of fresh caustic through the means 71. This is necessary when a substantial amount of unreacted H₂S is present in the effluent gases from the reactor 11 and reacts with caustic soda in the scrubber 49 to form alkali sulfide. If it is necessary to introduce additional water into the system to add to the caustic solution cooled in the cooler 65, fresh water can be introduced through the means 72.

Now, the tertiary butyl mercaptan alone, as taken from the separator 58 and valved conduit 59, or together with higher boiling products taken from the reservoir 27 and line 80, is suitable for further treatment. The charge taken through conduit 82 is carried to a preheater 83 wherein it is vaporized. The vapors in the preheater 83 pass through the preheater outlet 84 to the reactor 85, where they are subjected to the elevated temperature conditions prevailing therein for a relatively short period of time, preferably from about several seconds to several minutes. The temperature of the heat transfer medium of reactor 85, entering through line 86 and exiting through line 87, is controlled by the temperature control 88 so that the temperature of the reactor 85 is maintained within the range that will give the desired decomposition, as discussed hereinabove and as illustrated below.

When in the reactor 85 under the conditions described herein, the tertiary butyl mercaptan decomposes to isobutylene and hydrogen sulfide. If higher boiling materials such as tertiary butyl monosulfide and di-isobutylene are also present in the vapors, they also will be decomposed to isobutylene and hydrogen sulfide in accordance with the equations shown above. The effluent gases flow through the discharge conduit 91 to the condenser 90 wherein any undecomposed mercaptan and higher boiling products are condensed. The condensate flows into the chamber 95, from which it can be withdrawn through the outlet connection 96. It will be obvious to those skilled in the art that the condensate removed through the outlet connection 96 can be reintroduced in the reactor by any suitable means (not shown), such as by a connection with conduit 82.

The uncondensed portion of the decomposition mixture flows through the vapor outlet 97 (of the chamber 95) to the bottom of a separator 98. This uncondensed portion, predominantly comprised of isobutylene and hydrogen sulfide, and possible traces of undecomposed mercaptan, rises in the separator 98 and contacts a downstream of a solution, such as aqueous tri-potassium phosphate whereupon hydrogen sulfide is converted to the corresponding potassium acid sulfide. The isobutylene and undecomposed mercaptan, if present, are unaffected by the aqueous tri-potassium phosphate and are removed through the vapor outlet 101 from which they pass to the bottom of a scrubber 102. Isobutylene and undecomposed mercaptan, if present rise in the scrubber 102 and contact a downstream of scrubbing solution such as aqueous caustic soda whereupon undecomposed mercaptan is converted to the corresponding mercaptide. The isobutylene is unaffected by the caustic soda in the scrubber 102 and is removed through the vapor outlet 104 from which it passes through a drier 105, which contains a suitable drying medium such as calcium chloride, etc. From the drier 105, substantially pure isobutylene flows through conduit 106 to a condenser 107 and then through the condenser outlet 108 to a sealed storage chamber 109. Isobutylene may be withdrawn from the sealed chamber 109 as a liquid through the valved outlet 110, or as a vapor through the valved outlet 111.

The aqueous tri-potassium phosphate containing potassium acid sulfide taken from the H₂S separator 98 through the outlet 100 may be taken to a suitable still (not shown) where the solution may be heated and hydrogen sulfide regenerated therefrom. The hydrogen sulfide thus obtained may be used again in the process, entering as through valved conduit 34. The regenerated aqueous tri-potassium phosphate may also be used again and introduced into conduit 99. Similarly, the caustic soda solution containing alkali mercaptide taken from scrubber 102 through outlet 104 may be taken to a still (not shown) such as the still 54 previously described. In the still, the alkali mercaptide is converted to the corresponding tertiary mercaptan and introduced in the process as through conduit 82 (connecting means not shown).

It will be understood, of course, that solutions other than aqueous tri-potassium phosphate may be used to remove H₂S; for example, a tri-ethanolamine solution, an alkali phenolate solution, etc. may be used.

It is one feature of this invention that high pressures are not required in either the initial operation in which a tertiary base olefin is converted to the corresponding tertiary mercaptan, or in the subsequent operation in which the said mercaptan is decomposed to said olefin. On the contrary, pressures varying from atmospheric to about 50 pounds per square inch are used in the initial operation. In order that the initial operation be carried out in the vapor phase, it is necessary that the pressure be less than that pressure at which liquefaction of the hydrocarbon would occur at the operating temperature. It will readily be seen that the use of pressures from about atmospheric to about four atmospheres are not such as to require the use of expensive high-pressure reaction chambers. Atmospheric pressure, however, is preferred for use in the aforesaid subsequent operation.

As indicated above, the proportions of reactants, hydrocarbons and hydrogen sulfide can be varied considerably in the initial operation. Theoretically, the optimum molar ratio of tertiary base olefin, contained in the hydrocarbon mixture, to hydrogen sulfide would be 1:1. In some cases, however, more complete conversions of the tertiary base olefin to the corresponding tertiary mercaptan are obtained when a slight excess is used. Tertiary base olefins are notorious for their tendency to polymerize and this polymerization reaction tends to complete with the addition reaction, with the resultant formation of high boiling, poly-tertiary base olefins. An excess of hydrogen sulfide, therefore, will increase the conversion of said olefin to the corresponding mercaptan by affording greater opportunity for the tertiary base olefin-hydrogen sulfide reaction.

While it is possible, and is contemplated herein, to use the catalyst without a catalyst support in the initial operation, it is preferred that the catalyst be supported on an adsorbent inert carrier. Many such substances may be used for this purpose, typical of which are wood charcoal, cocoanut charcoal, granulated coke, certain clays which are catalytically inactive in said initial operation (as opposed to active non-plastic clays), silica gel, etc. Correspondingly, it is preferred that one of the catalysts, discussed hereinabove, be similarly supported when the tertiary mercaptan is decomposed to the corresponding tertiary base olefin in the aforesaid subsequent operation.

In the following table, data is presented to demostrate the influence of temperature upon the decomposition of a typical tertiary mercaptan, tertiary butyl mercaptan, obtained as indicated hereinabove, and upon related products—tertiary butyl monosulfide and di-isobutylene—which are also obtained in small quantities in the treatment of isobutylene with $H_2S$. The decomposition of each individual compound was effected in a reactor comprising a glass tube (inside diameter 42 mm.) containing a contact material as indicated in the table, and each reaction product was worked up by removing hydrogen sulfide and unreacted material with aqueous caustic solution, and drying isobutylene, as described hereinabove.

It will be observed from the data in the table that a tertiary mercaptan decomposes more readily to the corresponding tertiary base olefin when subjected to a thermal treatment—with or without a catalyst of the type shown—than does the corresponding monosulfide or a polymer of said olefin; and that said monosulfide decomposes more readily than said polymer. It will also be apparent that all of these materials decompose more readily when a catalyst of the type shown is present, than when heat alone is used. The data also demonstrate the importance of temperature in the method contemplated herein.

From the foregoing description and examples, it should be clear that the present method is an effective means for obtaining substantially pure tertiary base olefins from hydrocarbon mixtures containing one or more of such olefins. The present method, therefore, provides a convenient means for obtaining pure tertiary base olefins which are useful in the preparation of organic chemicals, synthetic fuels, elastomers, resins, etc. The present method is currently of particular value in providing pure isobutylene for the manufacture of "butyl rubber" and certain synthetic fuels.

It is to be understood that this invention is not limited to the foregoing illustrative examples but is to be broadly interpreted as a method of separating a tertiary base olefin from hydrocarbon mixtures by selectively converting a tertiary base olefin, through the agency of an inorganic compound such as hydrogen sulfide to compounds which are susceptible of reversion or decomposition to said tertiary base olefin, separating said compounds from the reaction mixture containing the unconverted hydrocarbons present in the original hydrocarbon mixtures, reconverting or decomposing said compounds to said tertiary base olefin and isolating the latter as a substantially pure compound.

It is to be understood that the present invention is not to be limited to the foregoing typical illustrative examples of the same, but is to be construed broadly as defined by the language of the appended claims.

We claim:

1. The method of purifying a tertiary base olefin containing a non-tertiary base olefin hydrocarbon as a contaminant which comprises: contacting an admixture of said contaminated tertiary base olefin and hydrogen sulfide in the vapor phase for a short contact time with a catalyst

*Table I*

| Material charged | Contact material | Vol. of contact material, cc. | Contact time, sec. | Temp., °C. | Per cent conversion to isobutylene (one pass) |
|---|---|---|---|---|---|
| THERMAL DECOMPOSITION | | | | | |
| Tertiary butyl mercaptan | Porous plate | 1,000 | 44 | 232 | 6.4 |
| Do | ----do | 1,000 | 39 | 324 | 53.6 |
| Do | ----do | 1,000 | 36 | 427 | 93.5 |
| Di-tertiary butyl sulfide | ----do | 1,000 | 51 | 427 | 32.8 |
| Do | ----do | 1,000 | 42 | 594 | 53.0 |
| Diisobutylene | ----do | 1,000 | 43 | 427 | 7.0 |
| Do | ----do | 1,000 | 34 | 591 | 57.3 |
| CATALYTIC DECOMPOSITION | | | | | |
| Tertiary butyl mercaptan | Cocoanut charcoal impregnated with equal wt. of $H_3PO_4$ | 1,000 (750 grms.) | 42 | 160 | 23.0 |
| Do | ----do | ----do | 44 | 232 | 80.7 |
| Di-tertiary butyl sulfide | ----do | ----do | 60 | 316 | 51.3 |
| Do | ----do | ----do | 60 | 427 | 70.0 |
| Diisobutylene | ----do | ----do | 62 | 316 | 36.9 |
| Do | ----do | ----do | 64 | 427 | 71.2 | which promotes the selective conversion of said tertiary base olefin to the corresponding tertiary mercaptan; separating the said tertiary mercaptan from the reaction mixture obtained by the initial operation; decomposing said tertiary mercaptan to the said tertiary base olefin; and separating said tertiary base olefin from the decomposition mixture formed in the last-mentioned operation, thereby obtaining a substantially pure tertiary base olefin.

2. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan at a selective conversion temperature; separating said tertiary mercaptan from the reaction mixture obtained by the initial operation; decomposing said tertiary mercaptan to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

3. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan at a selective conversion temperature; separating said tertiary mercaptan from the reaction mixture obtained by the initial operation; decomposing said tertiary mercaptan to said tertiary base olefin in the presence of said catalyst at a temperature in excess of the optimum selective conversion temperature of the initial operation and less than the decomposition temperature of the said tertiary base olefin; and separating said tertiary base olefin from the decomposition mixture formed in the last-mentioned operation.

4. The method of separating a tertiary base olefin from a hydrocarbon mixture containing said olefin which comprises: contacting an admixture of said hydrocarbon mixture and hydrogen sulfide in the vapor phase for a short contact time, from about several seconds to several minutes, with a catalyst which promotes the selective conversion of said tertiary base olefin with hydrogen sulfide to the corresponding tertiary mercaptan at a selective conversion temperature; separating said tertiary mercaptan from the reaction mixture obtained by the initial operation; decomposing said tertiary mercaptan to said tertiary base olefin in the presence of said catalyst at a temperature in excess of the optimum selective conversion temperature of the initial operation and less than the decomposition temperature of the said tertiary base olefin; and separating said tertiary base olefin from the decomposition mixture formed in the last-mentioned operation.

5. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan at a selective conversion temperature; separating said tertiary mercaptan from the reaction mixture obtained by the initial operation; thermally decomposing said tertiary mercaptan to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

6. The method of separating a tertiary base olefin from a hydrocarbon mixture containing said olefin which comprises: contacting an admixture of said hydrocarbon mixture and hydrogen sulfide in the vapor phase for a brief contact time, from about several seconds to several minutes, with a catalyst which promotes the selective conversion of said tertiary base olefin with hydrogen sulfide to the corresponding tertiary mercaptan at a selective conversion temperature; separating said tertiary mercaptan from the reaction mixture obtained by the initial operation; thermally decomposing said tertiary mercaptan to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

7. The method of separating a tertiary base olefin from a hydrocarbon mixture containing said olefin which comprises: contacting an admixture of said hydrocarbon mixture and hydrogen sulfide in the vapor phase for a short contact time with phosphoric acid at a temperature between about 25° C. and about 175° C., thereby selectively converting said tertiary base olefin to the corresponding tertiary mercaptan; separating said tertiary mercaptan from the reaction mixture obtained by the initial operation; decomposing said tertiary base mercaptan to said tertiary base olefin at a temperature in excess of the optimum temperature of the initial operation and less than the decomposition temperature of the said tertiary base olefin; and separating said tertiary base olefin from the decomposition mixture formed in the last-mentioned operation.

8. The method of separating isobutylene from a hydrocarbon mixture containing said isobutylene which comprises: contacting an admixture of said hydrocarbon mixture and hydrogen sulfide in the vapor phase for a short contact time with phosphoric acid at a temperature between about 25° C. and about 175° C., thereby selectively converting said isobutylene to tertiary butyl mercaptan; separating said mercaptan from the reaction mixture obtained in the initial operation; decomposing said mercaptan to isobutylene at a temperature in excess of the optimum temperature of the initial operation and less than the decomposition temperature of isobutylene; and separating isobutylene from the decomposition mixture formed in the last-mentioned operation.

9. The method of separating isobutylene from a hydrocarbon mixture containing said isobutylene which comprises: contacting an admixture of said hydrocarbon mixture and hydrogen sulfide in the vapor phase for a short contact time with phosphoric acid at about 75° C., thereby selectively converting said isobutylene to tertiary butyl mercaptan; separating said mercaptan from the reaction mixture obtained in the initial operation; decomposing said mercaptan to isobutylene at a temperature in excess of about 150° C. and less than the decomposition temperature of isobutylene; and separating isobutylene from the decomposition mixture formed in the last-mentioned operation.

10. The method of separating isobutylene from a hydrocarbon mixture containing said isobutylene which comprises: contacting an admixture of said hydrocarbon mixture and hydrogen sulfide in the vapor phase for a short contact time with phosphoric acid at a temperature between about 25° C. and about 175° C., thereby selectively converting said isobutylene to tertiary butyl mercaptan; separating said mercaptan from the reaction mixture obtained in the initial operation; decomposing said mercaptan to isobutylene in the presence of said catalyst at a temperature in excess of the optimum temperature of the initial operation and less than the decomposition temperature of isobutylene; and separating isobutylene from the decomposition mixture formed in the last-mentioned operation.

11. The method of separating isobutylene from a hydrocarbon mixture containing said isobutylene which comprises: contacting an admixture of said hydrocarbon mixture and hydrogen sulfide in the vapor phase for a short contact time with phosphoric acid at about 75° C., thereby selectively converting said isobutylene to tertiary butyl mercaptan; separating said mercaptan from the reaction mixture obtained in the initial operation; decomposing said mercaptan to isobutylene in the presence of said phosphoric acid at a temperature in excess of about 150° C. and less than the decomposition temperature of isobutylene; and separating isobutylene from the decomposition mixture formed in the last-mentioned operation.

12. The method of separating isobutylene from a hydrocarbon mixture containing said isobuylene which comprises: contacting an admixture of said hydrocarbon mixture and hydrogen sulfide in the vapor phase for a short contact time with phosphoric acid at about 75° C., thereby selectively converting said isobutylene to tertiary butyl mercaptan; separating said mercaptan from the reaction mixture obtained in the initial operation; thermally decomposing said mercaptan to isobutylene at a temperature of about 300° C. and less than the decomposition temperature of isobutylene; and separating isobutylene from the decomposition mixture formed in the last-mentioned operation.

13. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan at a selective conversion temperature; separating unchanged hydrocarbons of said hydrocarbon mixture and hydrogen sulfide from the reaction mixture obtained by the initial operation, and thermally decomposing the remainder of said reaction mixture containing said tertiary mercaptan at a temperature in excess of the optimum selective conversion temperature of the initial operation and less than the decomposition temperature of the said tertiary base olefin; and separating said tertiary base olefin from the decomposition mixture formed in the last-mentioned operation.

14. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan at a selective conversion temperature; separating unchanged hydrocarbons of said hydrocarbon mixture and hydrogen sulfide from the reaction mixture obtained by the initial operation, and decomposing the remainder of said reaction mixture containing tertiary mercaptan in the presence of said catalyst, at a temperature in excess of the optimum selective conversion temperature of the initial operation and less than the decomposition temperature of the said tertiary base olefin; and separating said tertiary base olefin from the decomposition mixture formed in the last-mentioned operation.

15. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan, tertiary sulfide and tertiary base olefin polymer, at a selective conversion temperature; separating said tertiary mercaptan, tertiary sulfide and tertiary base olefin polymer from the reaction mixture obtained by the initial operation; concurrently decomposing said tertiary mercaptan, tertiary sulfide and tertiary base olefin polymer to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

16. The method of separating a tertiary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan, tertiary sulfide and tertiary base olefin polymer, at a selective conversion temperature; separating said tertiary mercaptan, tertiary sulfide and tertiary base olefin polymer from the reaction mixture obtained by the initial operation; concurrently decomposing said tertiary mercaptan, tertiary sulfide and tertiary base olefin polymer to said tertiary base olefin in the presence of said catalyst at a temperature in excess of the optimum selective conversion temperature of the initial operation and less than the decomposition temperature of the said tertiary base olefin; and separating said tertiary base olefin from the decomposition mixture formed in the last-mentioned operation.

17. The method of separating a tetriary base olefin from a hydrocarbon mixture containing said olefin which comprises: contacting an admixture of said hydrocarbon mixture and hydrogen sulfide in the vapor phase for a short contact time with a catalyst which promotes the selective conversion of said tertiary base olefin with hydrogen sulfide to the corresponding tertiary mercaptan, tertiary sulfide and tertiary base olefin polymer, at a selective conversion temperature; separating said tertiary mercaptan, tertiary sulfide and tertiary base olefin polymer from the reaction mixture obtained by the initial operation; concurrently, thermally decomposing said tertiary mercaptan, tertiary sulfide and tertiary base olefin polymer to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

DARWIN E. BADERTSCHER.
DUNCAN J. CROWLEY.
CHARLES F. FEASLEY.

Certificate of Correction

Patent No. 2,386,773. October 16, 1945.

DARWIN E. BADERTSCHER ET AL.

It is hereby certified that errors appear in the printed specification of the above numbered patent requiring correction as follows: Page 2, first column, line 21, for "teritary" read *tertiary*; page 3, second column, line 37, strike out "(2) $(H_3C)_3C-S-C(CH_3)_3 \longrightarrow 2(H_3C)_2C=CH_2 + H_2S$"; page 5, first column, line 47, for "cloride" read *chloride*; page 7, first column, line 16, for "complete" read *compete*; line 40, for "demostrate" read *demonstrate*; and that the said Letters Patent should be read with these corrections therein that the same may conform to the record of the case in the Patent Office.

Signed and sealed this 9th day of April, A. D. 1946.

LESLIE FRAZER,
*First Assistant Commissioner of Patents.* olefin polymer, at a selective conversion temperature; separating said tertiary mercaptan, tertiary sulfide and tertiary base olefin polymer from the reaction mixture obtained by the initial operation; concurrently, thermally decomposing said tertiary mercaptan, tertiary sulfide and tertiary base olefin polymer to said tertiary base olefin at a temperature in excess of the optimum selective conversion temperature of the initial operation and less than the decomposition temperature of the said tertiary base olefin; and separating said tertiary base olefin from the decomposition mixture formed in the last-mentioned operation.

DARWIN E. BADERTSCHER.
DUNCAN J. CROWLEY.
CHARLES F. FEASLEY.

Certificate of Correction

Patent No. 2,386,773.   October 16, 1945.

DARWIN E. BADERTSCHER ET AL.

It is hereby certified that errors appear in the printed specification of the above numbered patent requiring correction as follows: Page 2, first column, line 21, for "teritary" read *tertiary*; page 3, second column, line 37, strike out "(2) $(H_3C)_3C-S-C(CH_3)_3 \longrightarrow 2(H_3C)_2C=CH_2 + H_2S$"; page 5, first column, line 47, for "cloride" read *chloride*; page 7, first column, line 16, for "complete" read *compete*; line 40, for "demostrate" read *demonstrate*; and that the said Letters Patent should be read with these corrections therein that the same may conform to the record of the case in the Patent Office.

Signed and sealed this 9th day of April, A. D. 1946.

LESLIE FRAZER,
*First Assistant Commissioner of Patents.*